H. T. Sisson.
Temporary Binder.

No. 2,199. Reissued Mar. 13, 1866.

Witnesses
Joseph L. Atkinson
Michael L. Stoll

Inventor,
Henry T. Sisson

UNITED STATES PATENT OFFICE.

HENRY T. SISSON, OF PROVIDENCE, RHODE ISLAND.

PORTFOLIO.

Specification forming part of Letters Patent No. 23,506, dated April 5, 1859; Reissue No. 2,199, dated March 13, 1866.

*To all whom it may concern:*

Be it known that I, HENRY T. SISSON, of the city and county of Providence, in the State of Rhode Island, have invented a new and useful Improvement in Portfolios and Paper-Files; and I do hereby declare that the following specification, taken in connection with the drawings, making a part of the same, is a full, clear, and exact description thereof.

Figure 1:
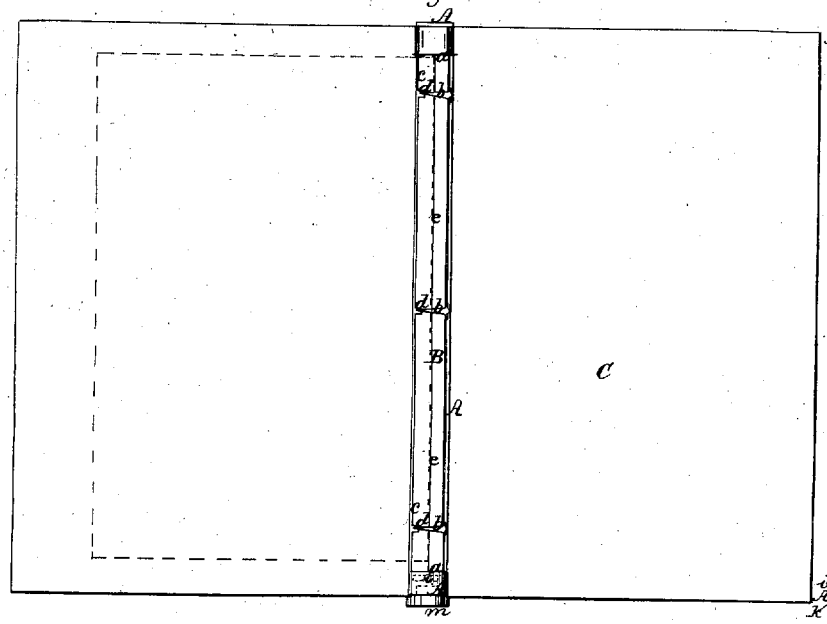
Figure 2:
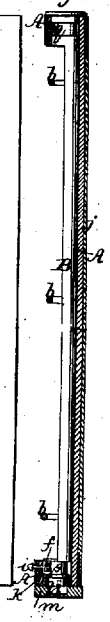
Figure 3:
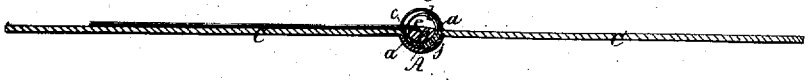
Figure 4:
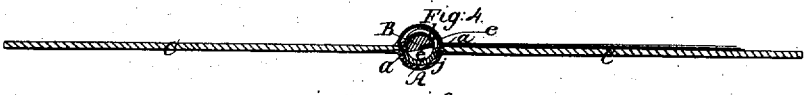
Figure 5:
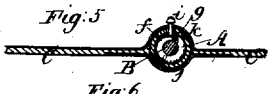
Figure 6:
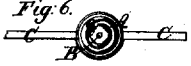

Figure 1 is an inside view of an open portfolio with my improvement. Fig. 2 is a central longitudinal section of what I call the "holder-case," which forms the back of the port-folio. Figs. 3 and 4 are transverse sections of the portfolio near the middle of its length. Figs. 5 and 6 are transverse sections the same near one end, but in different planes.

My invention is designed to afford a convenient means for readily filing letters or papers in book form for preservation or reference, and with a slight modification the apparatus can be used as a file for newspapers.

The invention consists in the use of a case provided with hooks for retaining the papers, in combination with a hinged spring flap or folder for arranging the same evenly upon the hooks and holding them in place. A contrivance is also introduced for holding the folder back against the tension of its actuating-springs while the sheets of papers are being placed in the proper position preparatory to filing.

In the accompanying drawings, A represents a holder or case made, by preference, of sheet metal, which in this instance is semi-cylindrical in form, with the exception of a small portion at the extreme ends, which is cylindrical, for the accommodation of the springs which actuate the folding flap. The opening or semi-cylindrical portion *a a* should be of sufficient length to accommodate the papers for which it is intended. To this holder are attached a series of hooks, *b b*, pointed at their ends, and curved to correspond with the arc which the edge of the folder-flap will describe. These hooks may nearly span the open portion *a a* of the holder-case, and need come short of touching the side of the case opposite to that to which they are attached by a space sufficient only to accommodate the flap when laid back and to allow of the convenient presentation of sheets of the usual thickness for filing.

The folding flap is shown at B, and consists of a semi-cylindrical piece of wood or other suitable material. It is made in length a little less than the opening C, and is provided with cylindrical ends, which are fitted into tubular sockets on bearings attached to the holder-case, so as to turn freely therein; and, as the edge of the flap will overlap the edge of the case, it is necessary to cut notches or openings in the same corresponding to the number of hooks, to allow it to turn upon its axis without being interfered with by the hooks.

The folder is provided at its ends with coiled springs *q q*, Figs. 2 and 6, applied in any convenient way, having each one end attached to the folder and the other to the cylindrical end of the holder, and operating to press the flap *c c* in a direction toward the side of the holder upon which the hooks *b b* are attached.

For the purpose of holding the flap back for convenience in removing a paper from the file or in adjusting one to be filed, I make use of a spring latch and catch of well-known construction, and which may be arranged in various ways familiar to all mechanics. The arrangement here shown consists of a spring-latch, *f*, attached to the interior of the holder within one of its cylindrical ends. *g* is a stop, so located on the folder that it will engage with the latch and hold back the folder, as shown at Fig. 3. The spring of the latch *f* has attached to it a button, *i*, which protrudes through the shell of the holder, and which, upon the application of pressure, will liberate the folder and permit it to fly against the sheet of paper and file it upon the hooks.

The apparatus above described is intended to be provided with a suitable book-binders' cover when the same is to be used as a portfolio, and by attaching a handle to the holder and dispensing with covers the same can be conveniently used as a file for newspapers.

I do not wish to limit myself to the precise construction of the several parts as described, as it is obvious that the same principle can be embodied in a variety of forms which will suggest themselves to persons familiar with the subject.

What I claim as my invention, and desire to secure by Letters Patent, is—

1. A holder, A, provided with curved paper-file hooks *b b* and a hinged spring-folder, B, or their equivalents in combination, arranged and operating substantially as described, for the purposes specified.

2. In combination with the folder B, a spring latch, *f*, and stop *g*, substantially as described.

HENRY T. SISSON.

Witnesses:

H. J. SPOONER,

BENJ. F. THURSTON.